United States Patent Office 2,938,797
Patented May 31, 1960

2,938,797
GUM CONFECTIONS AND MANUFACTURE THEREOF

Harry A. Toulmin, Jr., Dayton, Ohio, assignor to Commonwealth Engineering Company of Ohio, Dayton, Ohio No Drawing. Filed Feb. 4, 1959, Ser. No. 791,054

7 Claims. (Cl. 99—134)

The invention relates to confections and is more particularly concerned with confections of the gum or jelly type conventionally made from mixtures of sugars, corn syrup and starches.

The conventional method of making this type confection, such as gum drops, jelly beans, "autumn leaves," Turkish pastes, orange-, lemon-, and pineapple-flavored slices, etc., involves cooking a mixture of sucrose, corn syrup, starch, cream of tarter or fruit acid, and water until the desired mass viscosity is attained, and casting the mass into starch molds or otherwise shaping it to the desired small sizes and shapes. In these mixtures including starch, the cream of tartar or fruit acid is used to increase breakdown of the starch during the cooking thereof, accelerating the rate at which the water is boiled off and the mass reaches casting or shaping consistency.

The starch used is either regular (raw) thick boiling starch or a modified starch the cell structure of which has been altered by the action of a diastatic enzyme thereon or by chemical treatment with acids, alkalis, or oxidizing agents such as sodium hypochlorite or the like, and is, in consequence, a so-called thin-boiling starch.

Regardless of the starch used, whether raw or pretreated, the resulting confections tend to have a "starchy" taste which has been accepted simply because, up to now, it has been unavoidable. As is known, some effort has been made to camouflage or mask the starchy taste of these confections by using large amounts of sugar, corn syrup, flavoring adjuvants, or of all three of these constituents, but this is not a desirable expedient and does not influence another drawback of the confections, namely, the fact that they are not as gummy, or "chewy," as is expected of candies of this kind.

An object of this invention is to provide new and improved gum or jelly confections having improved chewing properties.

A further object is to provide gum or jelly confections requiring the use of relatively small amounts of flavoring agents for imparting the desired taste or flavor.

Still another object is to provide starch-free gum or jelly confections which can be made and cast or otherwise shaped without departing in any essential respect from the conventional operating techniques familiar to the factory operators versed in the manufacture of starch-containing confections.

These and other objects of the invention are accomplished by the use of certain dextrans having specific characteristics as the base constituent for the gums and jellies.

The dextrans which are used in making the present chewable confections are native, unhydrolyzed, water-soluble dextrans characterized in that from 94% to 97% of the linkages joining the anhydroglucose units are 1,6 linkages. These dextrans are further characterized in being essentially linear and made up of long chains. They are produced by the action on sucrose of the dextran-synthesizing bacterial strains bearing the NRRL (Northern Regional Research Laboratories) designations Leuconostoc mesenteroides B–1146, B–1145, B–512, B–1072 and B–1412. As microbiologically produced and separated from the fermentate resulting from incubation of the nutrient medium inoculated with one of the mentioned strains of Leuconostoc, these dextrans have very high molecular weights estimated in the millions.

Other native dextrans are known and are produced by other, different bacterial strains. Such dextrans may be water-soluble and have high molecular weights. However, they are not suitable for use in making the present chewable confections because they are made up of short chains or are crumbly materials.

The dextrans may comprise up to 80% by weight of the new confections, and is generally used in amounts of 60% to 80% by weight. This is surprising, since the dextrans are generally regarded as being adhesive, rather than plastic. Nevertheless, it is found that these particular, linear native dextrans can be used as base for confections which are palatable, free of starch taste since starch is not required, and are readily chewable without sticking to the mouth.

The confections can be made by dissolving the native, unhydrolyzed dextran in water, adding the appropriate amounts of sugar and corn syrup, and cooking the mass to the desired consistency. Flavoring and coloring agents can be added to the cooked mass which can also be further modified as to sweetness by the inclusion of an additional amount of corn syrup or sugar.

The following examples are illustrative of specific embodiments of the invention.

Example I

About 15 lbs. of finely divided native L.m. B–512 dextran are dissolved in about 20 gallons of water in a jacketed kettle, with heating at about 60° C. About 115 lbs. of cane sugar and 115 lbs. of corn syrup are added. The mass is cooked until it attains a viscosity such that it "strings" on testing. The heating is interrupted, and color and flavoring agents are added. The resulting mass is introduced into a vessel from which it is pumped into a starch mold containing depressions of the appropriate size and shape. The trays are set aside to dry in a room in which a temperature of from 50° C. to 60° C. is maintained and the air is kept in continuous circulation, so that the excess moisture in the gum candies is evaporated and continuously carried away from the vicinity of the trays. When dry and set to firm consistency, usually in from 24 to 36 hours, the candies are removed from the molds, cooled, sieved, brushed free of dextran clinging to their surfaces, if necessary, and finally coated or covered with sugar crystals in the usual manner.

Example II

About 110 lbs. of cane sugar and 110 lbs. of corn syrup are dissolved in 5 gallons of water and brought to a boil. To the resulting sugar-syrup solution are added 5 gallons of water whereby the temperature is brought to about 60–70° C. About 20 lbs. of finely divided L.m. B–1146 native dextran are then added in the form of an aqueous solution, and the whole is brought to the boil and cooked until it has the desired "string" consistency. It is cooled, the color and flavoring adjuvants are thoroughly mixed in, and the final batch is handled as in Example I.

Example III

A gum confection is made by admixing 110 lbs. cane sugar and 110 lbs. corn syrup dissolved in 5 gallons water, heating the resultant solution to a temperature between 60–70° C., thereafter introducing 20 lbs. finely divided L.m. B–1146 native dextran, continuing the heating of the solution until a stringy consistency of the solution is obtained, and then introducing sodium bisulfate in an amount of 0.01% to 0.1% by weight of said composition.

It may be found advantageous in some cases to include various adjuvants additional to those already described, for enhancing the appearance or transparency of the gum confections, such as small amounts, between about 0.01% to 0.1% of sodium bisulfate or of peroxides, e.g., calcium peroxide or magnesium peroxide.

These linear, native, water-soluble dextrans are bland, tasteless, odorless, and non-toxic materials which are ideally suited for use in gum candies which need not contain any starch at all, and are, therefore, entirely free of the starchy taste which has heretofore characterized gum drops and the like.

The confections may be used as items of special diets, as they may contain sugar substitutes like saccharine instead of sugar. Any amount of dextran may be used in making the batch, the corn syrup, sugar and other ingredients being used in the amounts needed to impart the desired taste to the confections. In the final confections, the dextran is the major constituent, usually comprising from 60 to 80% by weight thereof.

The last-mentioned and other variations and modifications may be made without departing from the spirit and scope of the invention, and, therefore, it will be understood that the invention is not to be limited except as defined in the appended claims.

What is claimed is:

1. A gum confection comprising a water-soluble, essentially linear, native, unhydrolyzed dextran made up of long chains and further characterized in that from 94% to 97% of the linkages joining the anhydroglucose units are 1,6 linkages, said dextran constituting the major constituent of the confection.

2. A gum confection comprising a water-soluble, essentially linear, native, unhydrolyzed dextran made up of long chains and further characterized in that from 94% to 97% of the linkages joining the anhydroglucose units are 1,6 linkages, sweetening, and coloring and flavoring agents, said dextran constituting the major constituent of the confection.

3. A gum confection comprising a cooked and set mixture of corn syrup, sugar and 80% by weight of native, water-soluble, unhydrolyzed, essentially linear dextran made up of long chains and further characterized in that 94% to 97% of the linkages joining the anhydroglucose units are 1,6 linkages, and 0.01% to 0.1% by weight of sodium bisulfate.

4. A gum confection comprising equal parts by weight of cane sugar and corn syrup; dextran in a ratio to cane sugar of about 1:5.5, water, and sodium bisulfate constituting 0.01% to 0.1% by weight of the total composition, whereby the gum confection is neither sticky nor starchy and its transparency is enhanced.

5. A process for making a gum confection which comprises dissolving 110 lbs. cane sugar in 110 lbs. corn syrup to five gallons water, heating the resultant solution to a temperature between 60–70° C. thereafter introducing 20 lbs. finely divided $L.m.$ B–1146 native dextran continuing the heating of the solution until a stringy consistency of the solution is obtained and then introducing sodium bisulfate in an amount of 0.01% to 0.1% by weight of said composition.

6. A gum confection consisting essentially of a cooked and set mixture of corn syrup, sugar, coloring and flavoring agents of native, water soluble, unhydrolyzed essentially linear dextran made up of long chains and further characterized in that 94 to 97% of the linkages joining the anhydroglucose units are 1,6 linkages; whereby the confection is devoid of a starchy taste.

7. The gum confection as described in claim 6 characterized by the addition of 0.01% to 0.1% by weight of sodium bisulfate, thereby imparting an increased transparency to the final product.

References Cited in the file of this patent

UNITED STATES PATENTS

| | | |
|---|---|---|
| 1,928,901 | Krno et al. | Oct. 3, 1933 |
| 2,089,217 | Mahoney | Aug. 10, 1937 |
| 2,409,816 | Wadsworth et al. | Oct. 22, 1946 |